(12) United States Patent
Koga

(10) Patent No.: US 7,212,748 B2
(45) Date of Patent: May 1, 2007

(54) FREQUENCY DETECTION CIRCUIT, OPTICAL RECEIVER AND OPTICAL TRANSMISSION SYSTEM USING THE SAME

(75) Inventor: Tadashi Koga, Tokyo (JP)

(73) Assignee: NEC Corporation, Tokyo (JP)

( * ) Notice: Subject to any disclaimer, the term of this patent is extended or adjusted under 35 U.S.C. 154(b) by 950 days.

(21) Appl. No.: 10/304,321

(22) Filed: Nov. 26, 2002

(65) Prior Publication Data

US 2003/0113122 A1    Jun. 19, 2003

(30) Foreign Application Priority Data

Nov. 28, 2001 (JP) .............................. 2001-361855

(51) Int. Cl.
*H04B 10/06* (2006.01)
(52) U.S. Cl. ..................... 398/202; 398/204; 398/205
(58) Field of Classification Search ................ 398/202, 398/204, 205; 375/130, 364, 355, 371, 375; 380/270
See application file for complete search history.

(56) References Cited

U.S. PATENT DOCUMENTS

| | | | |
|---|---|---|---|
| 4,969,160 A * | 11/1990 | Kingston | 375/130 |
| 5,140,453 A * | 8/1992 | Tsushima et al. | 398/205 |
| 5,515,197 A * | 5/1996 | Hooijmans et al. | 398/202 |
| 5,524,120 A | 6/1996 | Pride, III et al. | |
| 6,009,132 A * | 12/1999 | Scholtz | 375/355 |
| 2001/0019441 A1 | 9/2001 | Kogare et al. | |

FOREIGN PATENT DOCUMENTS

| | | |
|---|---|---|
| EP | 0 742 655 A1 | 11/1996 |
| JP | H02-183617 | 7/1990 |
| JP | H05-218968 | 8/1993 |
| JP | H07-236779 | 8/1995 |
| JP | H09-326757 | 12/1997 |
| JP | H10-313277 | 11/1998 |
| JP | 11-239099 | 8/1999 |

* cited by examiner

*Primary Examiner*—David C. Payne
(74) *Attorney, Agent, or Firm*—Scully, Scott, Murphy & Presser, P.C.

(57) ABSTRACT

When a PLL circuit is used to extract and recover clock component from an information data signal, where an optical receive signal has been converted into an electrical signal, and to monitor the frequency of a recovered clock, a low frequency section frequency detection circuit having a BPF (band-pass filter) where transmission center frequency has been shifted to higher frequency relative to center frequency of the electrical signal and a high frequency section frequency detection circuit having a BPF where the transmission center frequency has been shifted to lower frequency are provided in parallel. Utilizing a slope on one side of each transmission characteristic of the BPF makes it possible to set detection frequency freely and accurately. Therefore, a frequency detection circuit without using a special device in an optical transmitter/receiver, capable of easily detecting accurate frequency shift of $f_0 \pm \Delta f$ or more, and of low price and high performance, can be obtained.

10 Claims, 7 Drawing Sheets

FREQUENCY DETECTION CIRCUIT, OPTICAL RECEIVER AND OPTICAL TRANSMISSION SYSTEM USING THE SAME

BACKGROUND OF THE INVENTION

1. Technical Field of the Invention

The present invention relates to a frequency detection circuit. More particularly the invention relates to a frequency detection circuit that detects frequency of an information data signal or a clock signal synchronously recovered with the information data signal, in an optical receiver of an optical transmission system.

2. Description of the Related Art

In recent years, with high-speed and ultra long-distance of long-distance optical communication, an optical direct amplification repeating system has been used where an optical amplified repeater performs optical direct amplification to an optical signal, whose amplitude has been modulated by an information data signal in an optical transmitter, to compensate for attenuation of optical signal amplitude caused by transmission loss of transmission path fiber when the optical signal passes through the transmission path fiber.

In an optical transmission system using such an optical direct amplifier, output light of the optical direct amplifier contains amplified signal light and amplified spontaneous emission (ASE) noise that is noise occurred from the amplifier. A ratio of the ASE noise occupied in the output light of the amplifier increases as the number of repeater sections in multi-repeater transmission becomes larger, or as an input signal power to the optical direct amplifier is low and the amplifier is operated with higher gain.

When an information signal is recovered from the output light, an optical receiver receives an optical signal and the optical signal is converted into an electrical signal by an optical-to-electrical converter. However, probability of erroneous logical judgment of the information signal increases due to jitter in an amplitude direction by the ASE noise and electrical noise, and chromatic dispersion of the transmission path fiber, polarization mode dispersion, jitter in a phase direction caused by an optical-to-electrical amplifier, or the like. For this reason, waveform recovery of an output electrical signal from the optical-to-electrical converter is generally performed by using a Dflip-flop (DFF).

In this case, the DFF converts the electrical signal into a clock signal necessary for retiming, which has synchronized with the electrical signal, and a clock recovery method has been generally used conventionally where clock frequency component is extracted from the information data signal through a narrow band electrical band pass filter and an electrical limiter amplifier or the like amplifies it.

However, because manufacturing difficulties became obvious due to lack of operation speed of the electrical limiter amplifier with higher communication speed, a phase locked loop (PLL) method has been used, where frequency and phase of an output signal of a voltage controlled oscillator (VCO), which performs self-excited oscillation in a signal frequency band, are synchronized with the information data signal and a VCO output signal is thus used as a recovered clock signal, instead of the above-described method.

FIG. 1 is a schematic block diagram of a receiver, in particular, of a high-speed optical transmitter/receiver of the above-described constitution. In FIG. 1, the optical signal transmitted through the transmission path is subject to optical direct amplification by an optical amplifier 14, and then it is input to an optical band pass filter 15 that passes only signal light wavelength and removes the ASE noise light generated by the optical amplifier 14, input to an O/E (optical/electrical) converter 16, and thus becomes the electrical signal. The electrical signal is split into two by a splitter 17, where one is supplied to a DFF 23 for waveform recovery (retiming, reshaping or regeneration) and the other is input to a PLL circuit 18 that recovers a retiming clock signal for the DFF 23.

The PLL circuit 18 is in a well-known constitution, where a phase comparator 19 performs phase comparison to divided output and split output from a frequency divider 22 of a VCO 21 that performs self-excited oscillation in a frequency band of the information data signal, and the compared output becomes a control voltage of the VCO 21 via a loop filter or a low-pass filter 20. The output of the VCO 21 is a recovered clock signal that becomes a clock signal for retiming in the DFF 23.

Then, the information data signal recovered in the DFF 23 is subject to serial/parallel conversion in a demultiplexer (DMUX) 24, and is output after separated into low-speed recovered data and recovered clock signal.

As described, in a method where the PLL circuit is used for clock recovery, it is important to monitor that the output clock signal of the VCO 21 synchronizes with the information data signal in order to make the frequency of the clock signal for retiming match the frequency of the information data signal, and there exists a monitoring method where the frequency of the VCO output clock signal is detected with high accuracy to monitor its frequency shift from the frequency of the information data signal.

Accordingly, the low-speed-recovered clock signal output from the demultiplexer 24 is input to a frequency detection circuit 12 to monitor the relevant clock signal frequency, as shown in FIG. 1. Note that the output of the VCO 21 is split and the frequency of the split output may be monitored. The frequency detection circuit 12 uses, as shown in FIG. 2, a narrow band electrical band pass filter 101 that passes only information data signal frequency and a peak detection circuit 102, and there exists a method where a comparator 103 compares peak detection output with a reference value Vref0 and frequency change of the clock signal is detected as voltage change.

In this method, frequency detection accuracy largely depends on pass band characteristics of the narrow band electrical band pass filter 101 to be used, and the center frequency of the band characteristics is ideally the same as the information data signal frequency (referred to as f0) as shown in FIG. 3. If the frequency characteristics are in a shape that frequencies before and after the center frequency attenuate symmetrically, the frequency shift of ±Δf or more from f0 can be detected by judging the output of the peak detection circuit 102 with a threshold value (Vth: the reference value Vref0 of the comparator 103 in the constitution of FIG. 2).

However, it is extremely difficult to manufacture the filter while its center frequency is accurately matched to f0, and inclinations of the slopes before and after the center frequency f0 are not symmetrical but asymmetrical (different). As a result, the detection circuit can only detect the frequency, where the output voltage of the peak, detection circuit 102 becomes the threshold value Vth or less, in the frequency shift of f0−Δf or less or f0+Δf2 or more (Δf1≠Δf2), and furthermore, it is impossible to freely set the values of Δf1 and Δf2.

Particularly, a CDR (clock and data recovery) circuit, which uses the PLL circuit for recovery of data and clock described above, is used in an optical transmitter/receiver of a SONET (synchronous optical network) system being one of communication methods as well. Further, the output frequency of the VCO in the PLL circuit, which is a clock extraction circuit of the CDR circuit, is required to accurately match receive data in order to conform to a jitter specification in the SONET system.

Now, when it is presumed that the CDR circuit is used in the optical transmission system, the transmission speed of a most general SONET system is about 10 Gbps. Accurately detecting the frequency of such a high-speed clock signal is extremely difficult, because accuracy of the narrow band filter 101 shown in FIG. 2 at the center frequency f0 is low and inclination symmetry of the slopes of the filter transmission band characteristics before and after f0 is poor.

SUMMARY OF THE INVENTION

The object of the present invention is to provide a frequency detection circuit without using a special device in the optical transmitter/receiver, capable of easily detecting the accurate frequency shift of f0±Δf or more, and of low price and high performance, an optical receiver and an optical transmission system using the circuit.

The frequency detection circuit according to the present invention, which detects frequency of a monitored signal, comprises:

a first band filter having the monitored signal as an input, which has transmission characteristics where transmission center frequency is shifted to a higher frequency by Δf1 relative to an original frequency f0 of the monitored signal;

a second band filter having the monitored signal as an input, which has transmission characteristics where transmission center frequency is shifted to a lower frequency by Δf2 relative to the frequency f0; and detection unit that performs frequency detection to the monitored signal corresponding to outputs of the first and second filters.

Then, the detection unit utilizes the characteristic of a right-upward sloping section of the transmission characteristics of the first filter, utilizes the characteristic of a right-downward sloping section of the transmission characteristics of the second filter, for example, and thus performs the frequency detection.

Further, the detection unit is constituted so as to detect that the frequency of the monitored signal has shifted by ±Δf or more relative to the frequency f0, corresponding to the outputs of the first and second filters, for example.

Moreover, the detection unit has a first comparator that compares the output of the first filter with a threshold value that has shifted from f0 by −Δf, which is equivalent to the output of the first filter, and a second comparator that compares the output of the second filter with a threshold value that has shifted from f0 by +Δf, which is equivalent to the output of the second filter, for example, and the detection unit detects frequency shift of ±Δf or more corresponding to the outputs of the comparators.

Furthermore, the detection unit further has a logic-arithmetic unit that performs logical operation for the outputs of the first and second comparators, for example, and detects the frequency shift by its logical operation output.

Still further, the detection unit has first and second peak detectors that detect peak values in output amplitude of the first and second filters respectively, for example, and, inputs the outputs of the first and second peak detectors to the first and second comparators respectively.

In addition, the detection unit has first and second power detectors that detect output power of the first and second filters respectively, for example, and inputs the outputs of the first and second power detectors to the first and second comparators respectively.

In the present invention, when the PLL circuit is used to extract and recover clock component from the information data signal, where an optical receive signal has been converted into an electrical signal, and to monitor the frequency of a recovered clock, a low frequency section frequency detection circuit having a BPF (band pass filter) where the transmission center frequency has been shifted to the higher frequency relative to the center frequency of the electrical signal and a high frequency section frequency detection circuit having a BPF where the transmission center frequency has been shifted to the lower frequency are provided in parallel. Utilizing a slope on one side of each transmission characteristic of these BPF makes it possible to set detection frequency freely and accurately.

THE PREFERRED EMBODIMENTS OF THE INVENTION

Figure 4:
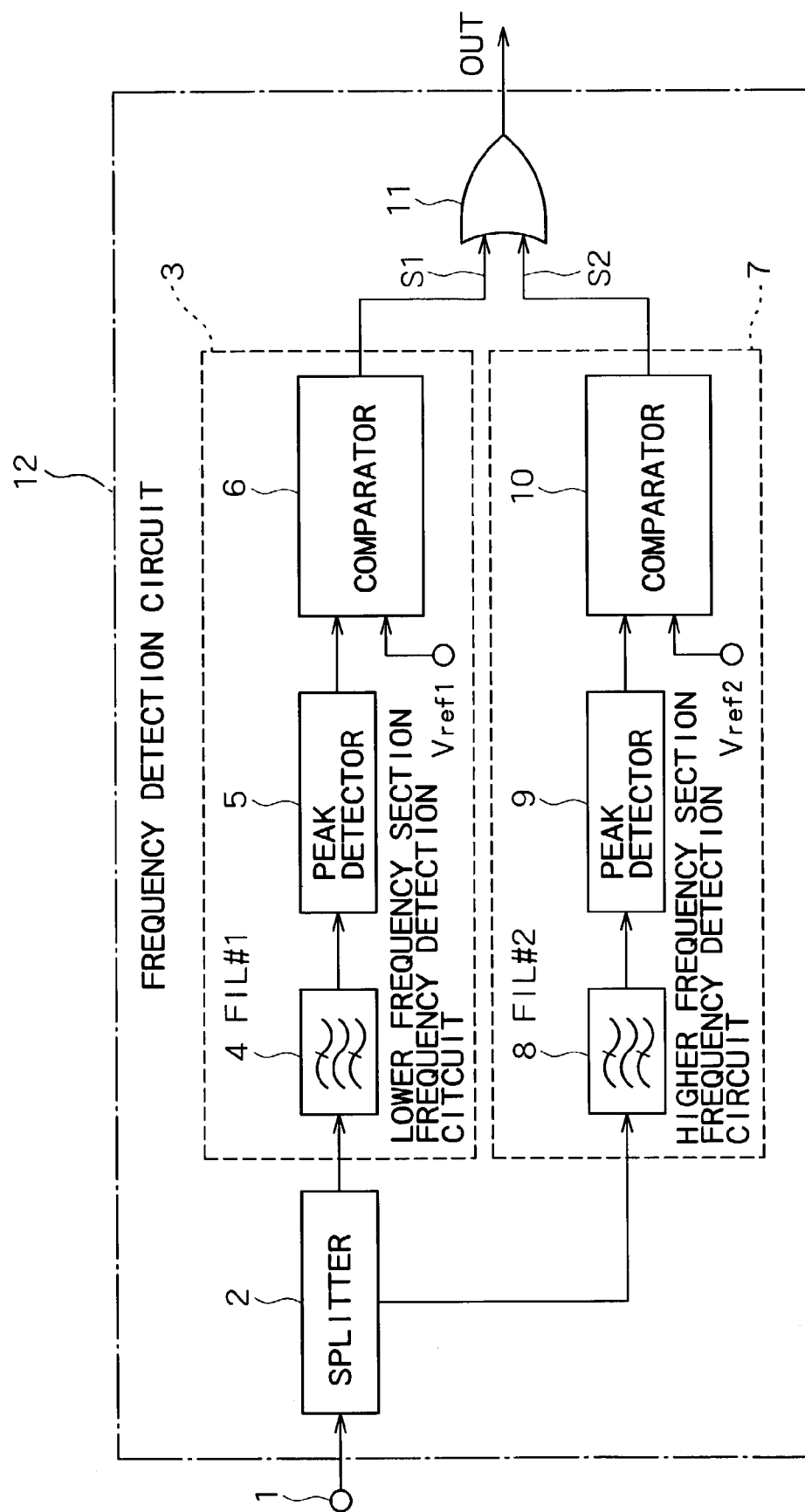
FIG. 4 is a view showing a constitution of the frequency detection circuit according to a first embodiment of the present invention.

Preferred embodiments of the present invention will be described referring to the drawings as follows. FIG. 4 shows the frequency detection circuit 12 according to an embodiment of the present invention. In FIG. 4, a clock signal (frequency under a normal state is set to f0) of a frequency monitoring subject, which has been input to a signal input terminal 1 is split into two by a splitter 2. Each split output is severally input to narrow band electrical band pass filters (#1, #2) 4 and 8, whose transmission center frequencies are f1 and f2 respectively.

Frequency component having passed through each filter 4, 8 is converted into direct-current voltage corresponding to an alternating-current amplitude value by peak detectors 5, 9, compared with a threshold value (Vref1, Vref2) equivalent to a direct-current voltage, which corresponds to frequency desired to be detected, by comparators 6, 10, and a logic signal taking two-valued level (high/low) is output as a comparison result. The output of the comparators 6, 10 is subject to logical addition operation by the OR circuit 11, and derived as frequency detection output.

Note that the filter 4, the peak detection circuit 5 and the comparator 6 constitute a lower frequency section frequency detection circuit 3, and the filter 8, the peak detection circuit 9 and the comparator 10 constitute a higher frequency section frequency detection circuit 7, in FIG. 4.

Figure 2:
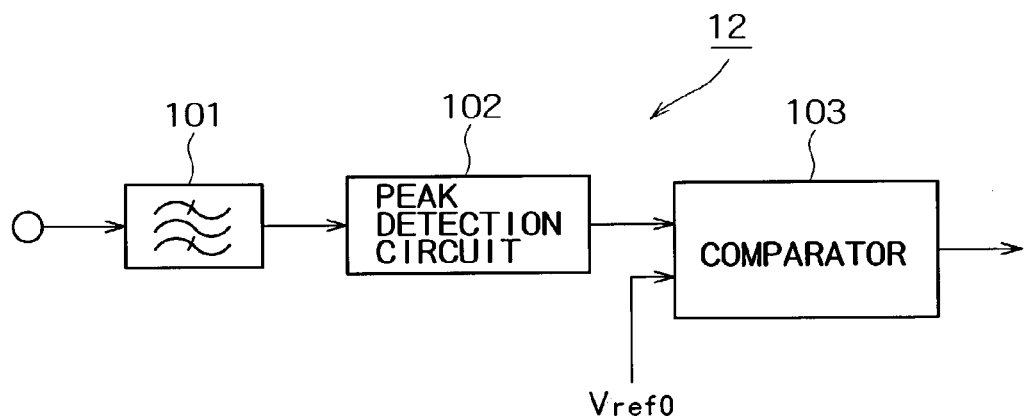
FIG. 2 is a view showing an example of a conventional frequency detection circuit.
Figure 3:
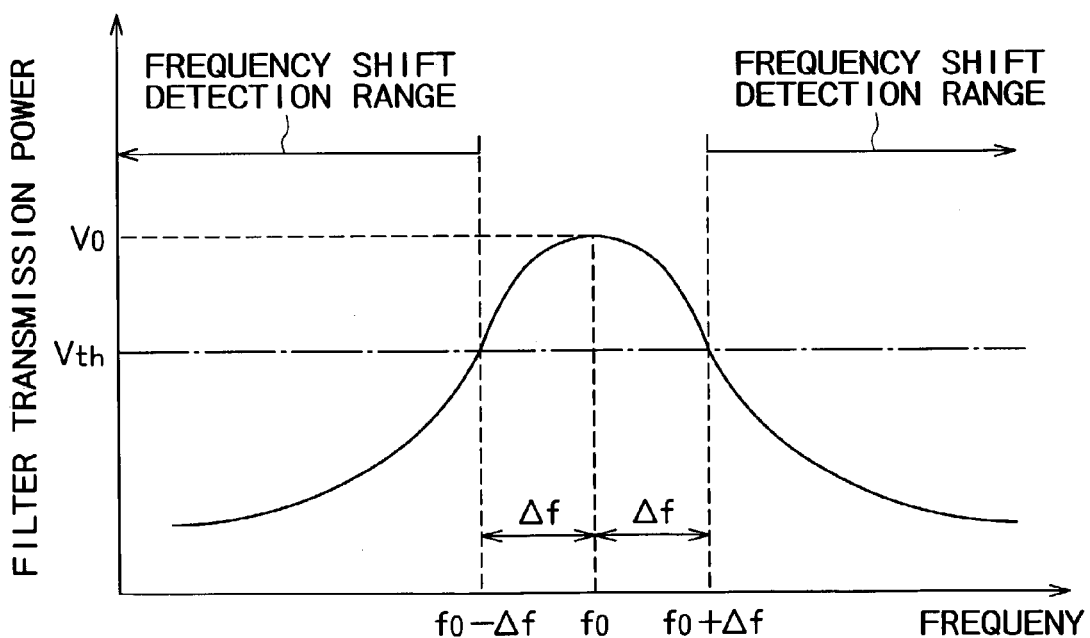
FIG. 3 is a view showing transmission characteristics of general filter for frequency detection.

Herein, referring to FIG. 2 again, the circuit has a constitution of the frequency detection circuit that is generally used as already described, it is desirable that the filter used here has frequency transmission capability shown in FIG. 3. As shown in FIG. 3, if the filter is an ideal one where the center frequency of the transmission band characteristics of the narrow band electrical band pass filter used matches the signal frequency f0 and a transmission band shape is symmetrical to the center frequency f0, judgment of frequency shift can be performed with the same threshold voltage Vth even if the signal frequency shifts either to the higher frequency or lower frequency by Δf or more relative to f0. Further, the narrower a filter transmission bandwidth is set, the smaller Δf can be set, and thus a slight frequency shift from f0 can be detected.

However, as described above, manufacturing of the narrow band electrical band pass filter while accurately matching its center frequency to f0 is extremely difficult. In addition, as shown in FIG. 5, since the transmission band shape also has different slope inclinations between both sides of the center frequency as it stands, the frequency shift from f0, which can be judged with a threshold voltage Vth is Δf or less in lower frequency and Δf3 or more in higher frequency, which means that ranges of frequency detection are different in the higher frequency and the lower frequency.

Therefore, in the conventional frequency detection circuit 12 as shown in FIG. 2, the value of detection frequency largely depends on manufacturing accuracy of the filter, and detection accuracy thus has a wider range due to different detection frequencies in the higher frequency and the lower frequency.

Figure 5:
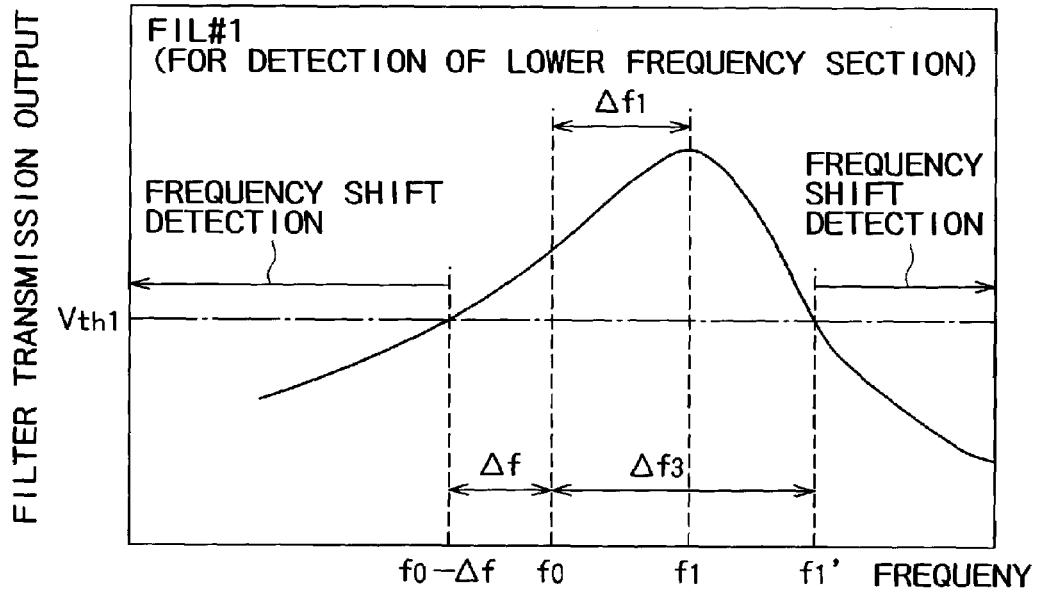
FIG. 5 is a view showing filter transmission characteristics of a lower frequency section frequency detection circuit.
Figure 6:
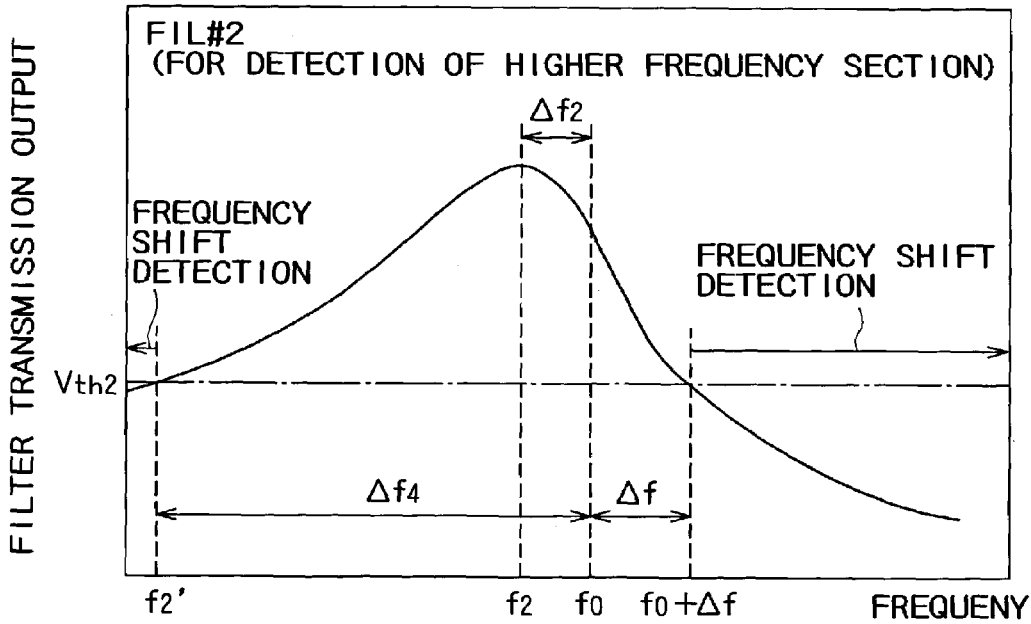
FIG. 6 is a view showing filter transmission characteristics of a higher frequency section frequency detection circuit.

In the present invention, to make detection frequency shift quantity in the higher frequency and detection frequency shift quantity in the lower frequency become totally the same value, the two kinds of the narrow band electrical band pass filters 4, 8 having different center frequencies are used as shown in FIGS. 5 and 6. The center frequencies f1, f2 of the two kinds of the narrow band electrical band pass filters are:

$$f1=f0+\Delta f1$$

$$f2=f0-\Delta f2$$

respectively, and they are intentionally shifted to the higher frequency and the lower frequency from the clock signal frequency f0.

As described, the two kinds of filters whose transmission center frequencies severally shift to the higher frequency and the lower frequency relative to the clock signal frequency f0 are used to constitute two kinds of the frequency detection circuits 3, 7 in parallel. Threshold values Vth1 and Vth2 are respectively set for the filters 4 and 8 such that the filter 4 with the transmission center frequency f1 detects the frequency shift of f0−Δf or less in the lower frequency, and the filter 8 with the transmission center frequency f2 detects the frequency shift of f0+Δf or more in the higher frequency. Then, an OR circuit 11 takes the logical addition of outputs S1, S2 of the two kinds of the detection circuits 3, 7, and it is possible to accurately detect the frequency shift of f0−Δf or less, or f0+Δf or more as a result.

Description will be made in detail for the embodiment of the present invention by using FIG. 4. In FIG. 4, the frequency detection circuit 12 has the lower frequency section frequency shift detection circuit 3, which is comprised of the clock signal input terminal 1 to which the clock signal of the monitoring subject (center frequency is set to f0) is input, the narrow band electrical band pass filter (FIL#1) 4 that essentially consists of surface acoustic filter (SAW) having the transmission center frequency f1=f0+Δf1, the peak detector 5 that performs peak detection to an amplitude value of the frequency component having passed the filter and converts it into the direct-current voltage component, and the comparator 6 that compares the output voltage of the peak detector 5 with the threshold value voltage for judgment Vth1 corresponding to the frequency shift.

Furthermore, it splits the clock signal of the monitoring subject by the splitter 2, and has the higher frequency section frequency shift detection circuit 7, which is comprised of the narrow band electrical band pass filter (FIL#2) 8 having the transmission center frequency f2=f0−Δf2, the peak detector 9 that performs peak detection to the amplitude value of the frequency component having passed the filter and converts it into the direct-current voltage component, and the comparator 10 that compares the output voltage of the peak detector 9 with the threshold value voltage for judgment Vth2 corresponding to the frequency shift. Still further, the detection circuit 12 is comprised of the OR circuit 11 that takes the logical addition of outputs from the lower frequency section frequency detection circuit 3 and the higher frequency section frequency detection circuit 7.

Figure 1:
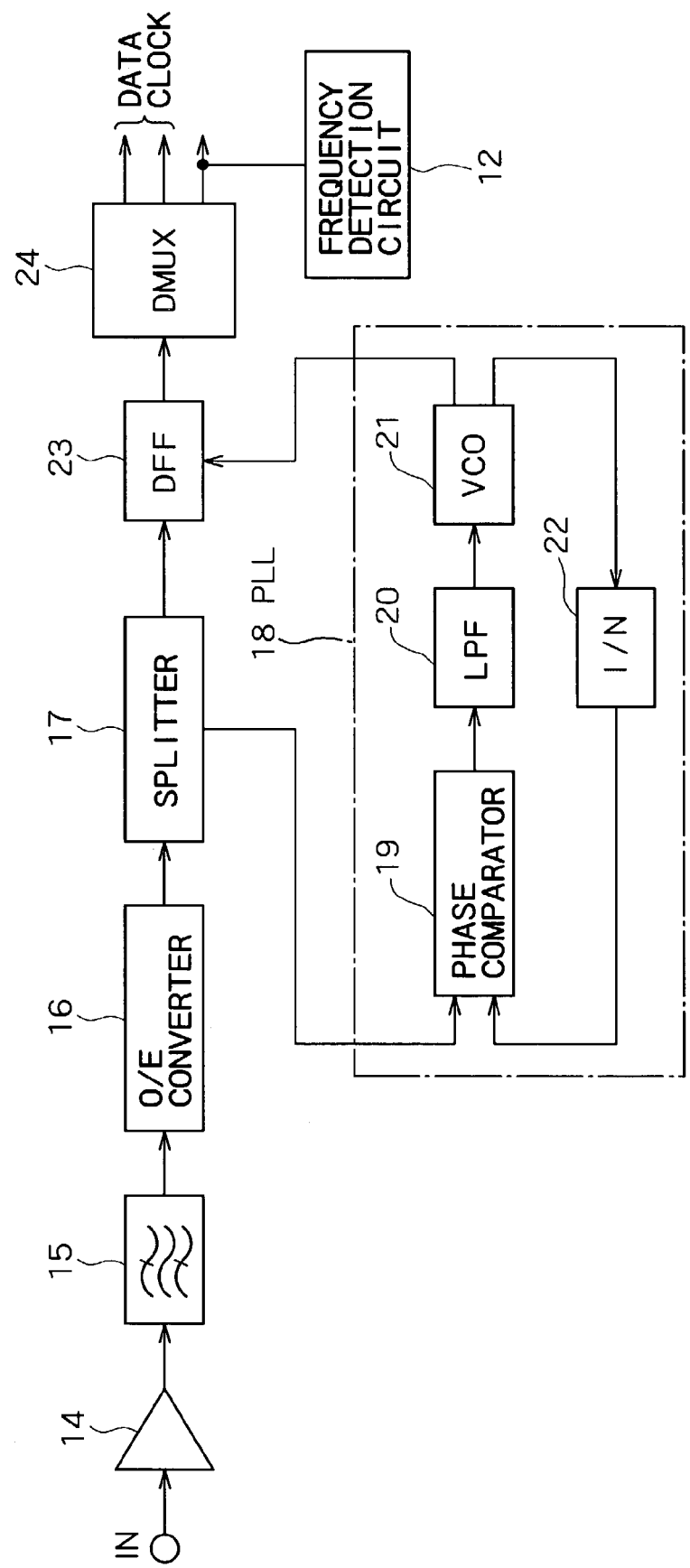
FIG. 1 is a view showing a part of an optical transmitter/receiver to which a frequency detection circuit of FIG. 4 is applied.

Incidentally, it is obvious that the highly accurate frequency detection circuit 12 shown in FIG. 4 is applied to the frequency detection circuit 12 in the high-speed optical transmitter/receiver shown in FIG. 1.

Next, an operation of the highly accurate frequency detection circuit 12 in FIG. 4 will be described. In FIG. 4, the clock signal input to the signal input terminal 1 is split into two by the splitter 2, and input to the narrow band electrical band pass filters 4, 8 whose transmission center frequencies are f1 and f2. The clock signal having passed the filter 4 is converted into the direct-current voltage corresponding to an alternating-current amplitude value of the clock signal having passed the filter 4 by the peak detector 5, and the comparator 6 performs threshold value judgment by a voltage value that corresponds to frequency desired to be detected.

Herein, in the transmission band characteristics of the narrow band electrical band pass filter 4, the center frequency f1 is not the signal frequency f0 but is f1=f0+Δf1 that is shifted by Δf1 to the higher frequency, as shown in FIG. 5. Accordingly, the right-upward slope of the filter transmission band characteristics necessarily corresponds to f0 and frequency lower than f0. Then, as shown in FIG. 5, the detection threshold value voltage of the filter 4 is set to Vth1, and if Vref1 is set such that an output level of the comparator 6 becomes high when the output voltage value of the peak detection circuit 5 is Vth1 or less, the output level of the comparator 6 becomes high in the case where the frequency of the clock signal input to the filter 4 is f0−Δf or less, or f0+Δf3(f1') or more, and thus the frequency shift can be detected. Herein, Δf3 is necessarily a value larger than Δf.

Similarly, in the transmission band characteristics of the narrow band electrical band pass filter 8, the center frequency f2 is not the signal frequency f0 but is f2=f0−Δf2 that is shifted by Δf2 to the lower frequency, as shown in FIG. 6. Accordingly, the right-downward slope of the filter transmission band characteristics necessarily corresponds to f0 and frequency higher than f0.

Then, as shown in FIG. 6, the detection threshold value voltage of the filter 8 is set to Vth2, and if Vref2 is set such that an output level of the comparator 10 becomes high when the output voltage value of the peak detection circuit 9 is Vth2 or less, the output level of the comparator 10 becomes high in the case where the frequency of the clock signal input to the filter 8 is f0+Δf or more, or f0+Δf4(f2') or less, and thus the frequency shift can be detected. Herein, Δf4 is necessarily a value larger than Δf.

Figure 7:
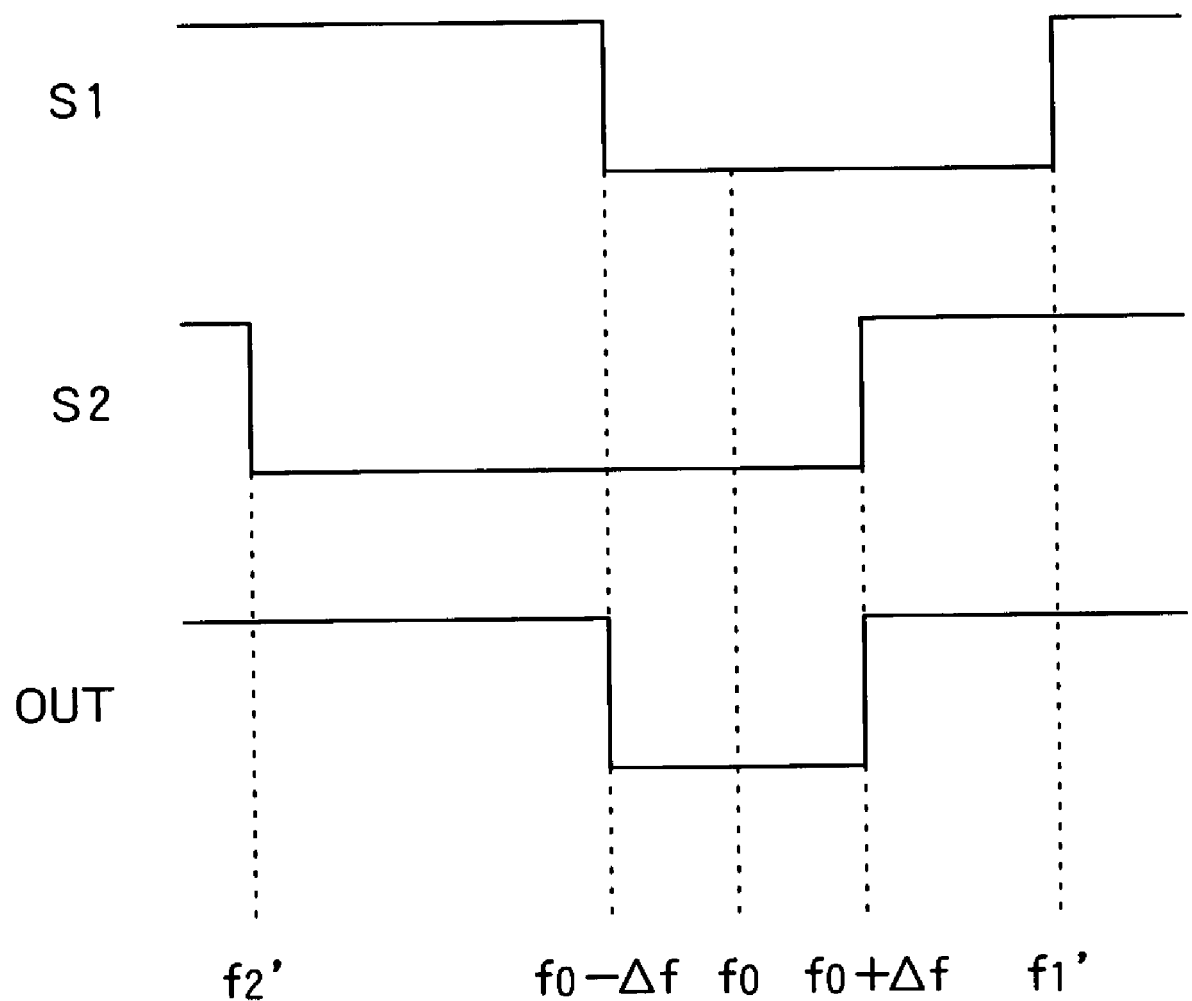
FIG. 7 is a view showing relationship between outputs of comparators 6, 10 and an OR circuit 11 in FIG. 4.

As a result, the both outputs S1, S2 of the comparators 6, 10 are as shown in FIG. 7, where the OR circuit 11 takes the logical addition of the both outputs S1, S2 and a detection waveform shown by OUT of FIG. 7 is obtained. In other words, a logical addition output level necessarily becomes high at f0−Δf or less in the lower frequency than f0, and the logical addition output level necessarily becomes high at f0+Δf or more in the higher frequency than f0. The logical addition output level becomes low only when the clock frequency f0 is within the range of f0−Δf<f0<f0+Δf, and thus highly accurate frequency detection can be performed.

Several variations are possible other than the constitution shown in the above-described FIG. 4. For example, the surface acoustic wave filter.(SAW filter) was used as the narrow band electrical band pass filter, but it may be another acoustic wave filter such as mechanical filter, crystal filter, ceramic filter, and monolithic crystal filter, or may be filter other than the acoustic wave filter such as dielectric resonator type filter.

Figure 8:
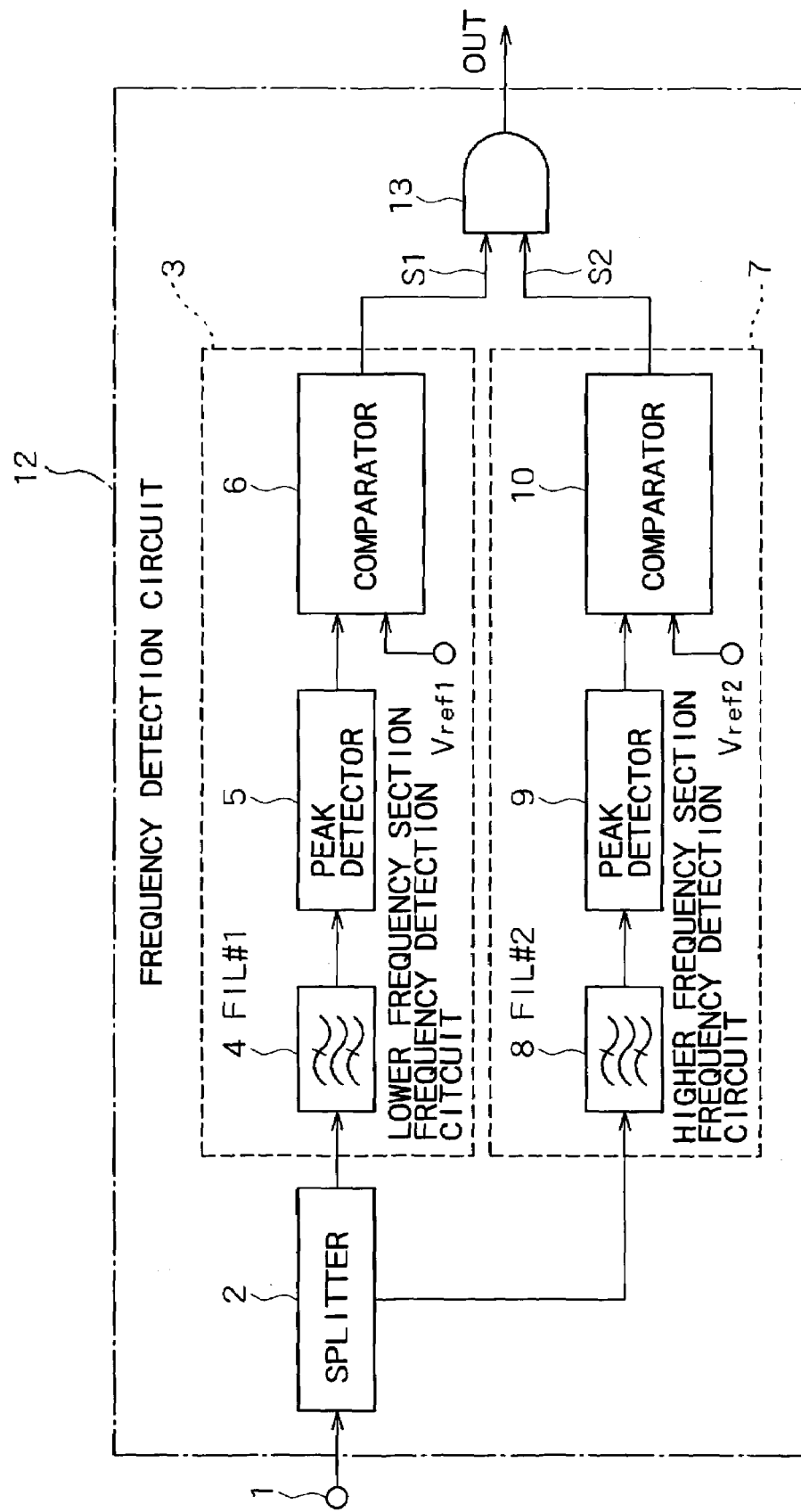
FIG. 8 is a view showing a constitution of the frequency detection circuit according to a second embodiment of the present invention.
Figure 9:
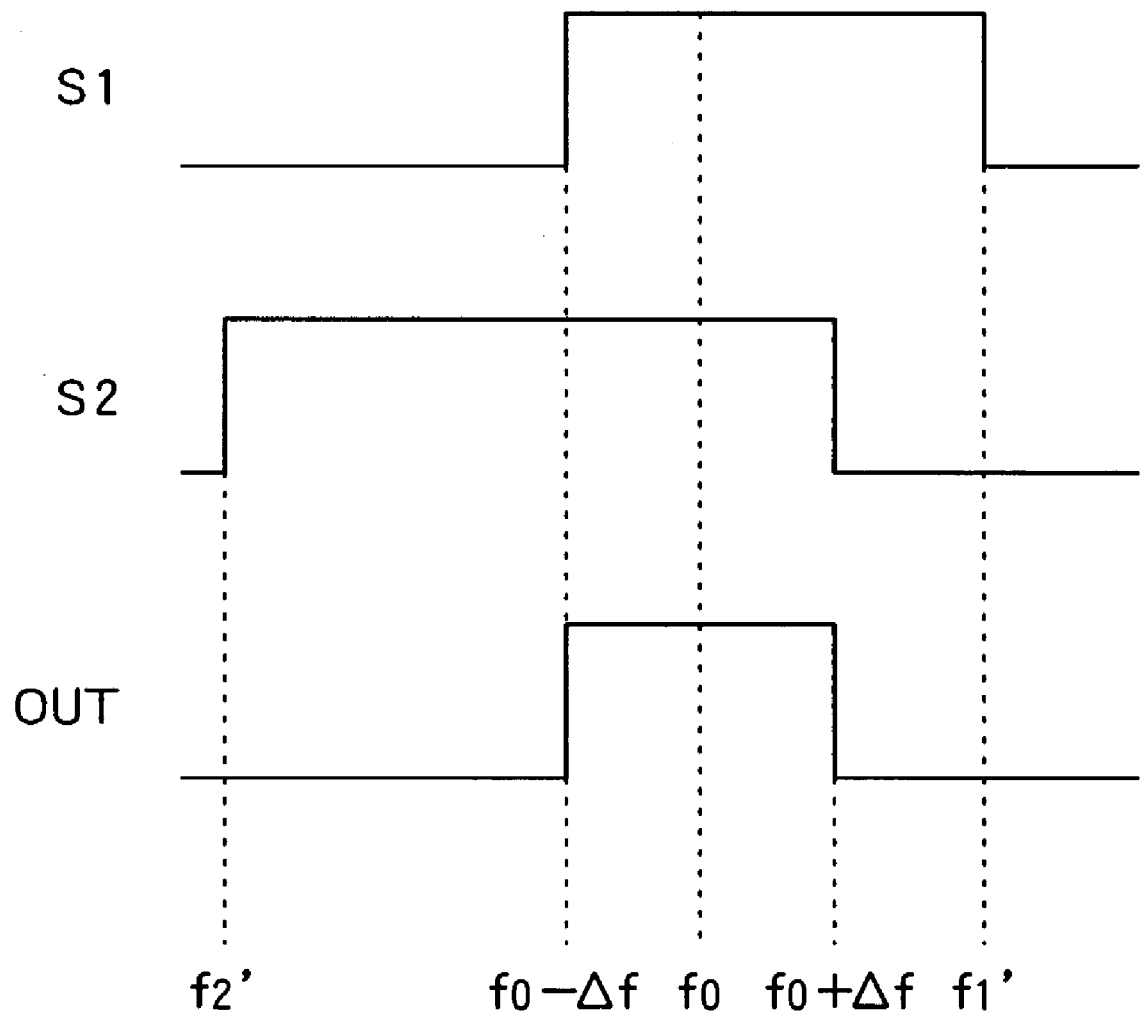
FIG. 9 is a view showing relationship between outputs of comparators 6, 10 and an AND circuit 13 in FIG. 8.

Moreover, if outputs with an opposite logic to the above-described example is used as compared outputs of the comparators 6, 10, the AND circuit that performs logical multiplication operation can be used as well instead of the OR circuit 11. FIG. 8 is the view showing the constitution of another embodiment of the present invention, which is a block diagram when the AND circuit 13 has been used instead of the OR circuit 11 in FIG. 4, and sections equivalent to the ones in FIG. 4 are shown in the same reference numeral. In the case of using the AND circuit 13, the relationship between the outputs S1, S2 of the comparators 6, 10 and the output OUT of the AND circuit 13 is as shown in FIG. 9. Other sections are the same as the ones of FIG. 4, and their description will be omitted.

Moreover, in addition to a voltage doubling rectifier circuit using a diode and a capacitor, a full-wave or half-wave rectifier circuit using a transistor and a transformer may be used as the peak detection circuit. Since the peak detection circuit in the present invention may be the one that detects a signal corresponding to the energy of the signal passing the narrow band filters 4, 8, any constitution that detects a signal power or detects an amplitude may be used other than the above-described constitution. In these cases, it is a matter of course that the threshold value, which is a comparative reference level of the comparator, is decided according to the signal power or the amplitude value that is output corresponding to f0±Δf of the transmission characteristics of each filter 4, 8.

Further, it is also a matter of course that electrical splitters and various kinds of electrical circuits may have any constitution of any kind as far as they hold performance thereof.

Still further, although this frequency detection circuit 12 may have a constitution that performs frequency monitoring of the clock signal output from the demultiplexer 24 (refer to FIG. 1) in the high-speed optical transmitter/receiver, it may also monitor the frequency of the output clock signal of the VCO 21 that constitutes the PLL circuit 18 and may monitor the frequency of the output clock signal of the frequency divider 22 in the PLL circuit 18.

Note that, the demultiplexer 24 in the high-speed optical transmitter/receiver converts a serial information data signal of 10 GHz into a parallel signal (S/P conversion), for example, and outputs a data signal whose speed has dropped to 1/N and a clock signal (one divided into 10 GHz/N) having frequency equal to the data signal. Accordingly, the frequency detection circuit monitors lower frequency when it monitors the clock signal that has been divided into 1/N rather than the case where it directly monitors the frequency of an oscillated clock signal of the VCO 21 in the PLL circuit 18. Thus, there is no need to use electronic parts or the like designed for ultra high-speed, which constitute the circuit, which is cost expedient and whose design is easy.

Moreover, it is certain that the frequency detection circuit 12 is used in the optical transmitter/receiver in terminal equipment of the SONET communication method in the above-described optical communication system, and it is obvious that the circuit is used for detection of signal frequency in another communication method in another communication system and also used in general frequency detection.

As described above, according to the present invention, frequency of the clock signal that has been synchronized with the information data signal can be detected highly accurately in retiming/waveform recovery of the information data signal in the optical transmitter/receiver, particularly in the receiver. There exerts an effect that an error in the information data signal received or an operation error in the optical receiver can be detected early and without fail.

Further, even when the frequency of the information data signal is an ultra high-speed signal on the order of GHz, the clock signal where the ultra high-speed information data signal has been divided into frequency one can be used as an input clock signal for this frequency detection circuit. There also exerts an effect that the detection circuit can be realized even when the electronic parts used in the circuit are not designed for ultra high-speed.

Moreover, there exerts another effect that the circuit can be applied for various kinds of optical transmitter/receiver regardless of a data modulation method whether it is direct modulation to a light source or external modulation, or regardless of a wavelength, transmission speed, or the like.

What is claimed is:

1. A frequency detection circuit that detects frequency of a monitored signal, comprising:
    a first band filter having said monitored signal as an input, which has transmission characteristics where transmission center frequency is shifted to a higher frequency by Δf1 relative to the original frequency f0 of said monitored signal;
    a second band filter having said monitored signal as an input, which has transmission characteristics where transmission center frequency is shifted to a lower frequency by Δf2 relative to said frequency f0; and
    a detection unit that performs frequency detection to said monitored signal corresponding to outputs of the first and second filters by utilizing the characteristic of a right-upward sloping section of the transmission characteristics of said first filter and utilizing the characteristic of a right-downward sloping section of the transmission characteristics of said second filter.

2. The frequency detection circuit according to claim 1, wherein
    said detection unit is constituted so as to detect that the frequency of said monitored signal has shifted by ±Δf or more relative to said frequency f0, corresponding to the outputs of said first and second filters.

3. The frequency detection circuit according to claim 2, wherein said detection unit has:

a first comparator that compares the output of said first filter with a threshold value that has shifted from said f0 by said $-\Delta f$, which is equivalent to the output of said first filter, and a second comparator that compares the output of said second filter with a threshold value that has shifted from said f0 by said $\Delta f$, which is equivalent to the output of said second filter, and said detection unit detects frequency shift of said $\pm\Delta f$ or more corresponding to the outputs of the comparators.

4. The frequency detection circuit according to claim 3, wherein said detection unit further has a logic-arithmetic unit that performs logical operation to the outputs of said first and second comparators, and detects said frequency shift by logical operation output thereof.

5. The frequency detection circuit according to claim 4, wherein said logic-arithmetic unit is an OR circuit.

6. The frequency detection circuit according to claim 4, wherein said logic-arithmetic unit is an AND circuit.

7. The frequency detection circuit according to claim 4, wherein said detection unit has first and second peak detectors that detect peak values in output amplitude of said first and second filters respectively, and inputs the outputs of the first and second peak detectors to said first and second comparators respectively.

8. The frequency detection circuit according to claim 4, wherein said detection unit has first and second power detectors that detect output power of said first and second filters respectively, and inputs the outputs of the first and second power detectors to said first and second comparators respectively.

9. An optical transmitter/receiver, comprising:

a PLL circuit that generates a clock signal synchronized with a receive information data signal;

unit for performing retiming recovery at least for said receive information data signal by recovered clock signal by the PLL circuit; and a frequency detection circuit that performs frequency detection to the recovered clock signal, wherein said frequency detection circuit is the frequency detection circuit according to claim 1.

10. An optical transmission system that uses the optical transmitter/receiver according to claim 9.

* * * * *